United States Patent [19]

Wilpers et al.

[11] Patent Number: 5,359,004
[45] Date of Patent: Oct. 25, 1994

[54] COCRACKED POLYMER BLEND AND PRODUCTS PRODUCED THEREFROM

[75] Inventors: Dale J. Wilpers, Houston; Charles C. Hwo, Sugar Land, both of Tex.

[73] Assignee: Shell Oil Company, Houston, Tex.

[21] Appl. No.: 116,105

[22] Filed: Sep. 2, 1993

Related U.S. Application Data

[63] Continuation of Ser. No. 894,485, Jun. 5, 1992, abandoned.

[51] Int. Cl.$^5$ ............................................. C08L 23/26
[52] U.S. Cl. ................................. 525/194; 525/240; 525/88
[58] Field of Search ................................. 525/194, 240

[56] References Cited

U.S. PATENT DOCUMENTS

| | | | |
|---|---|---|---|
| 3,121,070 | 2/1964 | Coover eta l. | 525/240 |
| 3,598,885 | 8/1971 | Peters | 525/240 |
| 3,887,534 | 6/1975 | Baba et al. | 525/275 |
| 4,282,076 | 8/1981 | Boynton | 525/240 |
| 4,489,034 | 12/1984 | Davison | 525/240 |
| 4,677,025 | 6/1987 | Davison et al. | 525/194 |
| 4,727,112 | 2/1988 | Kohyama et al. | 525/194 |
| 4,960,820 | 10/1990 | Hwo . | |
| 4,966,944 | 10/1990 | Kiang | 525/194 |

*Primary Examiner*—Carman J. Seccuro, Jr.
*Attorney, Agent, or Firm*—James O. Okorafor

[57] ABSTRACT

A method of producing a polyolefin blend, such as a polypropylene-polybutylene blend comprising preferentially cracking the polybutylene component with the aid of a cracking agent at a temperature sufficient to induce preferential cracking. The blend produced by the method of this invention has improved optical properties, shrinkage, and processability.

2 Claims, No Drawings

COCRACKED POLYMER BLEND AND PRODUCTS PRODUCED THEREFROM

This is a continuation of application Ser. No. 07/894,485, filed Jun. 5, 1992, now abandoned.

FIELD OF THE INVENTION

This invention generally relates to unique polyolefin blends and to processes of manufacturing these blends. More particularly, this invention relates to a cocracked polymer blend of polybutylene and polypropylene having improved properties, and to the products of these blends.

BACKGROUND OF THE INVENTION

The blending of polymers is well known in the art. Such blending may be done for various purposes, including improving the properties of the resulting blend, or to improve the processability of one or more component(s) of the blend.

Blend of polyolefins such as polypropylene and polybutylene are known in the art. Likewise known are the various processes utilized in the manufacture of these polymers, and the problems associated with these manufacturing processes. For example, it is known that the manufacture of a 100% ultrahigh melt flow polybutylene pellets is a slow process because of the difficulty in pelletizing which increases the costs of production. This difficulty is believed to be caused by the slow crystallization rate of polybutylene and the low hardness of the Form II (metastable) crystals of polybutylene.

It is desirable to alleviate the difficulties encountered in the manufacture of ultra high melt flow polybutylene pellets. This would facilitate the manufacturing of these pellets, and will also facilitate the production of polypropylene/polybutylene blends and products produced therefrom.

SUMMARY OF THE INVENTION

This invention provides a method of producing a polypropylene-polybutylene blend, having an exhibiting improved optical and shrinkage properties, comprising the steps of a) preferentially cracking the polybutylene component by the addition of a cracking agent at a temperature that is sufficient to induce said preferential cracking, and b) subsequently co-cracking the product of a) with polypropylene to produce said blend. The invention further provides products produced from the preferentially cracked blend.

The blend produced by the method of this invention has improved optical properties, shrinkage, and processability.

DETAILED DESCRIPTION OF THE INVENTION

All polyolefin polymers which are capable of being blended are suitable in the practice of this invention. These polymers include polyethylene, polybutene-1 (polybutylene), polybutene, polyketones, polyisoprene, and polymethylpentene and their copolymers. Polypropylene and polybutylene homo and copolymers are the preferred polyolefin polymers.

The useful polybutene-1 homo or copolymer can be isotactic, elastomeric, syndiotactic, or it can have any characteristic that is known or expected of polybutene-1. These polybutene-1 polymers have a melt flow in the range of from about 2 to 150, with a preferred range of from about 10 to 100, and a particularly preferred range of from 25 to 75 g/10 min. These polybutene-1 polymers including their methods of preparation, and their properties are known in the art. An exemplary reference containing additional information on polybutylene is U.S. Pat. No. 4,960,820 which is herein incorporated by reference.

The particularly preferred polybutene-1 polymer is Duraflex ® PB 0400. This polybutene-1 homopolymer has a melt flow of 49 g/10 min. at 230° C. and a molecular weight of 202,000. Duraflex ® PB 0400 is commercially available, and can be obtained from Shell Chemical Company of Houston, Tex..

The polypropylene used in the present invention is any crystallizable polypropylene. The polypropylene can be prepared by homopolymerizing propylene irrespective of the method used so long as a crystallizable polypropylene is formed. The preferred polypropylenes are the substantially isotactic polypropylenes prepared by the Ziegler/Natta or $MgCl_2$-supported catalyst polymerization process.

The propylene polymers usable herein can be either propylene homopolymers or copolymers. If propylene copolymers are used, they can be random or block copolymers with the comonomer content preferably 1–30 mole % of either ethylene, butene, or an alpha olefin having from 5 to 8 carbon atoms.

Propylene polymers useful in the invention preferably have a melt flow of less than 10.0, more preferably from about 0.1 to 0.9 g/10 min., as measured by ASTM D-1238, Condition L at 230° C. A particularly suitable propylene, has a melt flow of 0.8 g/10 min. and is available from Shell Chemical Company, of Houston, Tex. as PPNPR248.

Generally speaking, all compounds capable of cracking or visbreaking polyolefins are useful in the practice of this invention. These cracking agents include peroxides, and the use of gamma radiation from U.V. exposure, X-ray, or electron beam. The cracking agent is typically present in an amount of from about 50–20,000 ppm, with an amount of from about 1000–5000 ppm being preferred. In practice, the peroxides are typically used. These peroxides are exemplified by 2,5-dimethyl-2,5-bis(t-butylperoxyl)hexyne-3, "LUPERSOL 130" and 2,5-dimethyl-2,5-bis (t-butylperoxy)hexane, "LUPERSOL 101" both of which are trademarks of and commercially are available from Pennwalt Corporation. "LUPERSOL 101" is the preferred cracking agent.

Very broadly speaking, the process of practicing this invention involves dry blending two or more polymers, such as polypropylene and polybutene-1. These polymers have a relatively low melt flow or high molecular weight. The dry blended polymer is then fed into a processing device. The cracking agent can be added prior to or after feeding the dry blended polymer into the processing device. The processing temperatures are adjusted, within a temperature range of from about 125°–250° C., so as to permit the preferential cracking of the components of the polymer blend to a desired melt flow. Stated otherwise, the polymer having a lower melting point will first begin to crack, and will undergo more cracking than the polymer(s) having a higher melting point. For example, with a polypropylene-polybutene-1 blend, using temperatures as high as 180° C., the polybutene-1 begins to crack at about 130° C., while the polypropylene begins to crack at about 170° C.

The final properties, particularly melt flow of the blend depends on the amount of cracking agent used, and on the intended end-use application of the co-cracked blend. The melt flow of the cocracked polypropylene-polybutylene blend is in the range of 1-100 g/10 min., with 1-30 g/10 min. being preferred. This final melt flow can be manipulated to suit the end-use application. As an illustration, if film use is desired, the final melt flow can be manipulated to be in the range of 1-10 g/10 min.

The following non-limiting examples and tables further illustrate the various aspects of this invention.

EXAMPLE 1

Four samples were fabricated into 20 mil sheet on the Killion sheet line for T.M. Long stretching evaluation. The samples are listed below:

| 1 | PP5C08* | | |
|---|---|---|---|
| (Control) | | | |
| 2 | PP5C08/PBDP0800** 5 wt % | Dry Blend | |
| 3 | PP5C08/PBDP0800 5 wt % | Melt compounded | |
| 4 | PPNR248/PB0400*** 5 wt % | Co-cracked to 3.2 MF | |

*PP5C08 is a polypropylene homopolymer with a melt flow of 3.2 g/10 min., available from Shell Chemical Company, Houston, Texas.
**Duraflex ® DP 0800 is a polybutene-1 homopolymer with a melt flow of 490 g/10 min., available from Shell Chemical Company, Houston, Texas.
***PB0400 is a polybutene-1 homopolymer with a melt flow of 49 g/10 min., available from Shell Chemical Company, Houston, Texas.

The sheet extrusion conditions used were as herein listed:
Samples 2-4 each contain 5 wt % polybutylene

| Screw Carilon Type | Barrier with Mixing Section |
|---|---|
| Screen Packs | 20-60-100 mesh |
| Melt Temperature °F. | 410 |
| Top Roll °F. | 140 |
| Middle Roll °F. | 160 |
| Bottom Roll °F. | 140 |
| Screw RPM | 100 |

The processing results obtained are given in Tables 1 and 2.

TABLE 1

| SAMPLE # | BK PSI | % | THROUGHPUT #/HR | % |
|---|---|---|---|---|
| 1 (Control) | 1000 | — | 19.8 | — |
| 2 | 1000 | 0 | 20.56 | +3.7 |
| 3 | 850 | −15 | 20.2 | +2.0 |
| 4 | 1000 | 0 | 20.14 | +1.7 |

Sample Nos. 1 and 4 of Table 1, processed very well, there was no surging in either. Surging can be detected in the sheeting process, by the presence of ripples in the film as it exits the first and second stack rolls.

The back pressure trends were normal. The greater decrease between dry blends and compounds as seen in Sample Nos. 2 and 3 vs. Sample No. 4 was also noted in our throughput study.

The co-cracked sample showed no increase in back pressure and a 1.7% increase in throughput.

TABLE 2

| | Optical Properties | | | |
|---|---|---|---|---|
| SAMPLE # | THICKNESS (INCHES) | HAZE % | CLARITY % | % GLOSS 60 DEG |
| 1 (Control) | .019 | 48.10 | 0.10 | 93.60 |
| | .020 | 48.60 | 0.10 | 90.20 |

TABLE 2-continued

| | Optical Properties | | | |
|---|---|---|---|---|
| SAMPLE # | THICKNESS (INCHES) | HAZE % | CLARITY % | % GLOSS 60 DEG |
| | AVG. 0.0195 | 48.35 | 0.10 | 92.00 |
| 2 | .020 | 35.50 | 0.40 | 93.20 |
| | .020 | 36.90 | 0.30 | 92.30 |
| | AVG. 0.020 | 36.20 | 0.35 | 92.75 |
| 3 | .020 | 40.60 | 0.70 | 94.90 |
| | .020 | 36.70 | 0.60 | 93.00 |
| | AVG. 0.020 | 38.65 | 0.65 | 94.00 |
| 4 | .020 | 36.10 | 0.50 | 96.30 |
| | .020 | 46.00 | 0.50 | 92.40 |
| | AVG. 0.020 | 41.05 | 0.50 | 94.50 |

In Table 2, for Sample Nos. 1 and 2, the polypropylene and polybutene-1 have a melt flow of 3.2 and 490 g/10 min., respectively. Sample No. 4 starts with a low melt flow of polypropylene at 0.8 g/10 min. and of polybutylene at 49 g/10 min. and is cocracked so that the melt flow of its final product is equivalent or equal to that of Samples Nos. 2 or 3.

The thickness, haze, clarity and gloss of these samples were measured using their respective standard ASTM tests, and compared to the control (Sample No. 1). It is, as shown in Table 2, important to maintain a constant thickness. This is because increases in thickness adversely affect haze and clarity.

For the haze measurement, a lower numerical value indicates better performance, while for the clarity and gloss measurements, a higher numerical value indicates better performance. In comparison to the control (Sample No. 1), the co-cracked blend (Sample No. 4) has and exhibits superior haze, clarity and gloss performances. This unexpected improvement in optical properties is significant giving that for Sample No. 4, the polypropylene and polybutene-1 have a starting melt flow of 0.8 and 49 g/10 min., respectively.

While this invention has been described in detail for the purpose of illustration, it is not to be construed as limited thereby but is intended to cover all changes and modifications within the spirit and scope thereof.

What is claimed is:

1. A method of producing a polypropylene-polybutylene blend comprising the steps of:
    (a) utilizing polybutene with a starting melt flow of from about 25-75 g/10 min. blended with polypropylene with a starting melt flow of from about 0.1 to 0.8 g/10 min.;
    (b) adding to (a) from about 1000-5000 ppm of a peroxide cracking agent;
    (c) preferentially cracking the polybutene component of (b) at a temperature of about 130° C., and the polypropylene component of (b) at a temperature of about 170° C.; and
    (d) producing a polypropylene-polybutylene blend having a melt flow of from about 1-100 g/10 min.

2. A method of producing a polypropylene-polybutylene blend comprising the steps of:
    (a) utilizing polybutene with a starting melt flow of from about 25-75 g/10 min. blended with polypropylene with a starting melt flow of from about 0.1 to 0.8 g/10 min.;
    (b) adding to (a) from about 1000-5000 ppm of 2,5-dimethyl-2,5-bis(t-butylperoxy)hexane;
    (c) preferentially cracking the polybutene component of (b) at a temperature of about 130° C., and the polypropylene component of (b) at a temperature of about 170° C., and
    (d) producing a polypropylene-polybutylene blend having a melt flow of from about 1-30 g/10 min.

* * * * *